United States Patent
Chauhan et al.

(10) Patent No.: US 11,960,504 B2
(45) Date of Patent: Apr. 16, 2024

(54) DATA REPLICATION OVER LOW-LATENCY NETWORK

(71) Applicant: Bank of America Corporation, Charlotte, NC (US)

(72) Inventors: Sandeep Kumar Chauhan, Hyderabad (IN); Yash Sharma, Delhi (IN); Chinmay S. Barhale, Hyderabad (IN); Ravikiran Subramanya Rao, Hyderabad (IN); Ravi Kesani, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 17/465,554

(22) Filed: Sep. 2, 2021

(65) Prior Publication Data

US 2023/0062594 A1   Mar. 2, 2023

(51) Int. Cl.
*G06F 16/27* (2019.01)
*H04L 67/06* (2022.01)
*H04W 76/12* (2018.01)
*H04W 76/14* (2018.01)

(52) U.S. Cl.
CPC ............ *G06F 16/275* (2019.01); *G06F 16/27* (2019.01); *H04L 67/06* (2013.01); *H04W 76/12* (2018.02); *H04W 76/14* (2018.02)

(58) Field of Classification Search
CPC ...... G06F 16/27; G06F 16/273; G06F 16/275; G06F 16/2365; H04L 12/4633; H04L 67/1095; H04W 76/12; H04W 76/14
See application file for complete search history.

(56) References Cited

U.S. PATENT DOCUMENTS

| | | |
|---|---|---|
| 8,250,029 B2 | 8/2012 | Holenstein |
| 8,600,945 B1 | 12/2013 | Natanzon |
| 8,712,962 B1 | 4/2014 | Natanzon |
| 8,745,105 B2 | 6/2014 | Erofeev |
| 8,806,161 B1 | 8/2014 | Natanzon |
| 8,868,494 B2 | 10/2014 | Agrawal |
| 8,914,595 B1 | 12/2014 | Natanzon |
| 8,943,025 B2 | 1/2015 | Hirakawa |
| 9,003,374 B2 | 4/2015 | Ngo |
| 9,025,602 B2 | 5/2015 | Zhong |
| 9,069,479 B1 | 6/2015 | Natanzon |

(Continued)

*Primary Examiner* — Marcin R Filipczyk

(57) ABSTRACT

A system includes a first data center that includes a first computing device communicatively coupled to a first database. The first computing device is configured to determine data stored in the first database to be replicated to a second database communicatively coupled to a second computing device of a remote data center. The first computing device is further configured to determine whether a point-to-point data tunnel has been established across a broadband cellular network between the first computing device and the second computing device and to establish the point-to-point data tunnel across the broadband cellular network between the first computing device and the second computing device when it is determined that the point-to-point data tunnel has not been established. The first computing device is further configured to replicate the data to the second database by transmitting the data to the second computing device across the point-to-point data tunnel.

20 Claims, 3 Drawing Sheets

(56) References Cited

U.S. PATENT DOCUMENTS

| | | |
|---|---|---|
| 9,069,709 B1 | 6/2015 | Natanzon |
| 9,112,888 B2 | 8/2015 | Singh |
| 9,152,578 B1 | 10/2015 | Saad |
| 9,208,210 B2 | 12/2015 | Erofeev |
| 9,235,481 B1 | 1/2016 | Natanzon |
| 9,251,198 B2 | 2/2016 | Mutalik |
| 9,268,835 B2 | 2/2016 | O'Neill |
| 9,304,889 B1 | 4/2016 | Chen |
| 9,311,326 B2 | 4/2016 | Goyen |
| 9,323,750 B2 | 4/2016 | Natanzon |
| 9,344,494 B2 | 5/2016 | Mordani |
| 9,483,511 B2 | 11/2016 | Prahlad |
| 9,535,801 B1 | 1/2017 | Natanzon |
| 9,563,683 B2 | 2/2017 | Abercombie |
| 9,671,965 B2 | 6/2017 | Desimone |
| 9,716,754 B2 | 7/2017 | Swift |
| 9,740,572 B1 | 8/2017 | Natanzon |
| 9,772,789 B1 | 9/2017 | Natanzon |
| 9,934,102 B2 | 4/2018 | Blea |
| 9,971,657 B2 | 5/2018 | Prahlad |
| 10,019,194 B1 | 7/2018 | Baruch |
| 10,078,556 B2 | 9/2018 | Clare |
| 10,152,398 B2 | 12/2018 | Ramakrishman |
| 10,191,813 B2 | 1/2019 | Fan |
| 10,223,023 B1 | 3/2019 | Natanzon |
| 1,026,862 A1 | 4/2019 | Hrle |
| 10,324,640 B1 | 6/2019 | Chen |
| 10,338,851 B1 | 7/2019 | Kronrod |
| 10,387,448 B2 | 8/2019 | Xu |
| 10,394,665 B2 | 8/2019 | Wilkinson |
| 10,459,908 B2 | 10/2019 | Varley |
| 10,474,644 B2 | 11/2019 | Krupakaran |
| 10,474,682 B2 | 11/2019 | Patel |
| 10,481,825 B2 | 11/2019 | Vijayan |
| 10,515,057 B2 | 12/2019 | Mortensen |
| 10,530,858 B1* | 1/2020 | Parulkar ............... G06F 16/178 |
| 10,608,870 B2 | 3/2020 | Rath |
| 10,706,072 B2 | 7/2020 | Chen |
| 10,754,557 B2 | 8/2020 | Lingarajappa |
| 10,778,457 B1* | 9/2020 | Mathew ................ H04L 67/563 |
| 10,838,640 B1 | 11/2020 | Golden |
| 10,929,240 B2 | 2/2021 | Rath |
| 10,942,666 B2 | 3/2021 | Pudipaty |
| 10,990,609 B2 | 4/2021 | O'Neill |
| 10,997,161 B2 | 5/2021 | Lee |
| 11,036,599 B2* | 6/2021 | Salapura .............. G06F 11/2041 |
| 2017/0041296 A1* | 2/2017 | Ford ....................... G06F 21/64 |
| 2020/0244484 A1* | 7/2020 | Kommula .............. H04L 45/306 |
| 2021/0314291 A1* | 10/2021 | Chandrashekhar ... H04L 45/021 |

\* cited by examiner

DATA REPLICATION OVER LOW-LATENCY NETWORK

TECHNICAL FIELD

This disclosure relates generally to networking and more specifically to data replication over a low-latency network.

BACKGROUND

Data replication is utilized by organizations to improve access to data. For example, a global organization with a geographically dispersed customer base may utilize multiple data centers that are located in various physical locations. In order to provide products and services and to improve data availability and accessibility, data replication is typically used to store the same data in each of the data centers. However, data replication latency can cause data collisions that may result in data loss and a negative customer experience.

SUMMARY

According to an embodiment, a first computing device located at a first data center is communicatively coupled to a first database. The first computing device is configured to determine data stored in the first database to be replicated to a second database communicatively coupled to a second computing device at a remote data center. The first computing device is further configured to determine whether a point-to-point data tunnel has been established across a broadband cellular network between the first computing device and the second computing device and to establish the point-to-point data tunnel across the broadband cellular network between the first computing device and the second computing device when it is determined that the point-to-point data tunnel has not been established. The first computing device is further configured to replicate the data to the second database by transmitting the data to the second computing device across the point-to-point data tunnel.

According to another embodiment, a system includes a first data center and a second data center. The first data center includes a first computing device communicatively coupled to a first database. The second data center includes a second computing device communicatively coupled to a second database. The second computing device is configured to determine data stored in the second database to be replicated to the first database. The second computing device is further configured to determine whether a point-to-point data tunnel has been established across a broadband cellular network between the second computing device and the first computing device and to establish the point-to-point data tunnel across the broadband cellular network between the second computing device and the first computing device when it is determined that the point-to-point data tunnel has not been established. The second computing device is further configured to replicate the data to the first database by transmitting the data to the first computing device across the point-to-point data tunnel.

According to yet another embodiment, a method includes determining data stored in a first database to be replicated to a second database. The first database is communicatively coupled to a first computing device of a first data center, and the second database communicatively coupled to a second computing device of a second data center. The method further includes determining whether a point-to-point data tunnel has been established across a broadband cellular network between the first computing device and the second computing device. The method further includes establishing the point-to-point data tunnel across the broadband cellular network between the first computing device and the second computing device when it is determined that the point-to-point data tunnel has not been established. The method further includes replicating the data to the second database by transmitting the data to the second computing device across the point-to-point data tunnel.

A practical application of the data replication system describe herein is that data is able to be replicated across multiple data centers regardless of physical location using a low-latency, highly-reliable broadband cellular network. In this manner, computing resources (e.g., processor, memory, and/or network resources) are not wasted handling data collisions that are typical when using existing data replication systems and methods. By reducing the number of data collisions, data loss is reduced or limited, thereby improving the efficiency of computing systems.

Embodiments of the present disclosure provide technological solutions to technological problems. For example, the disclosed embodiments replicate data across multiple geographically-diverse databases using a low-latency, highly-reliable broadband cellular network (e.g., a 5G cellular network). As a specific example, a point-to-point data tunnel (e.g., using a 5G backhaul connection) may be established between two geographically-diverse data centers, and data may be replicated from a database of a first data center to a database of a second data center across the point-to-point data tunnel. This increases the speed of data replication over typical data-replication systems and reduces transmission errors that are typical on alternative less-reliable networks. By replicating data faster across locations using point-to-point data tunnels over broadband cellular networks, data collisions that are typical on most data-replication networks are reduced or eliminated altogether, thereby reducing data loss and improving overall customer experience. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Data replication is utilized by organizations to improve access to data. For example, a global organization with a geographically dispersed customer base may utilize multiple data centers that are located in various physical locations. In order to provide products and services (e.g., mobile applications, websites, etc.) and to improve data availability and accessibility, data replication is typically used to store the same data in each of the data centers. However, data replication latency can cause data collisions that may result in data loss and a negative customer experience. For example, a typical data replication system utilizes a centralized system (e.g., a leader-based replication system) where a single computing system transmits data to multiple data centers. This requires sharing of network bandwidth, which can increase network latency, network congestion, and ultimately the loss of data.

To address these and other problems with existing data replication systems, the data replication systems and methods of this disclosure replicate data using point-to-point data tunnels over a low-latency, highly-reliable broadband cellular network (e.g., a 5G cellular network). As a specific example, a point-to-point data tunnel (e.g., using a 5G backhaul connection) may be established between two geographically-diverse data centers, and data may be replicated from a database of a local data center to a database of a remote data center across the point-to-point data tunnel. This increases the speed of data replication over typical leader-based replication system and reduces transmission errors that are typical on other less-reliable networks. By replicating data faster across locations using point-to-point data tunnels over broadband cellular networks, data collisions that are typical of most data-replication systems are reduced or eliminated altogether, thereby reducing data loss and ultimately improving overall customer experience.

Figure 1:
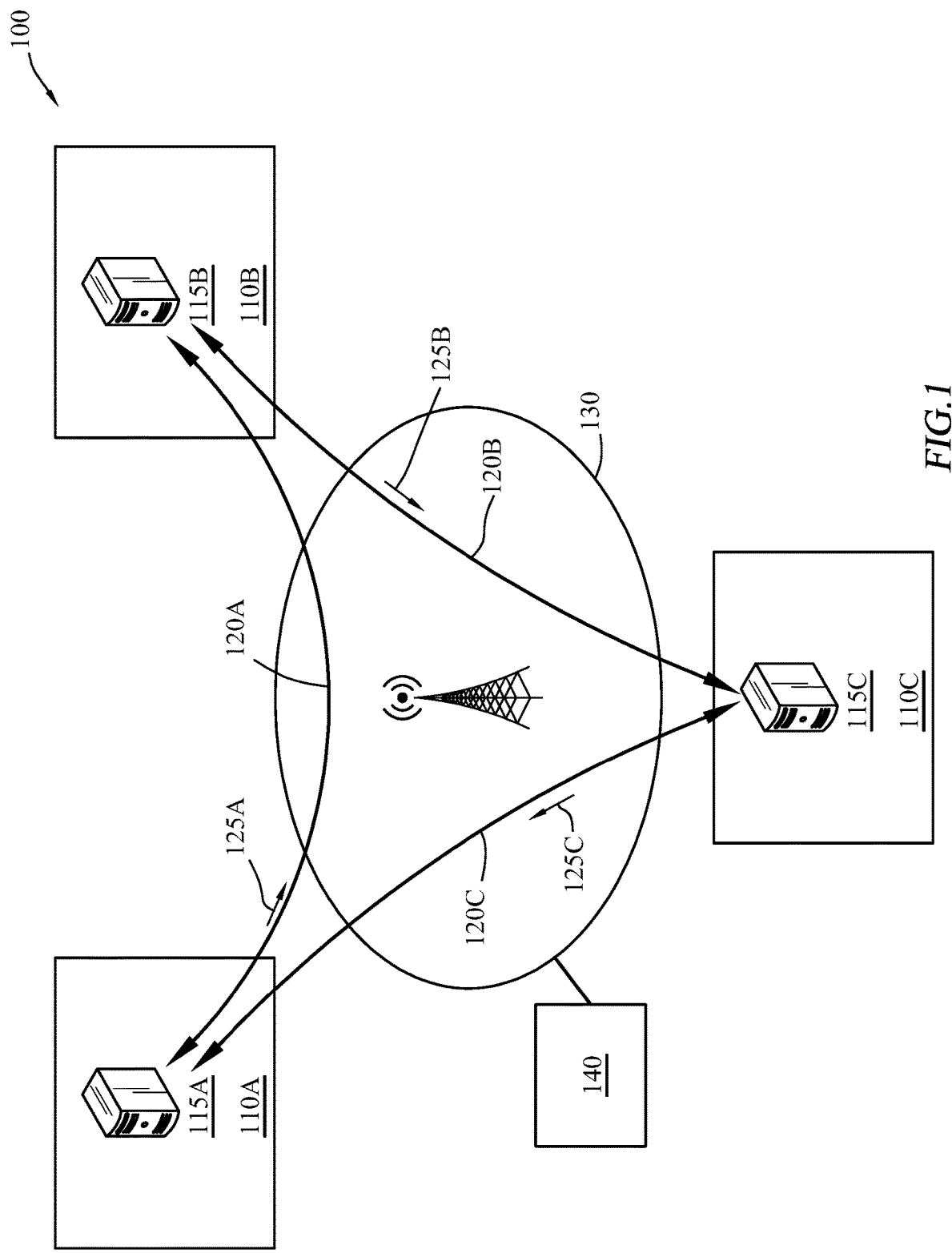
FIG. 1 illustrates an example system for data replication over a low-latency network.
Figure 2:
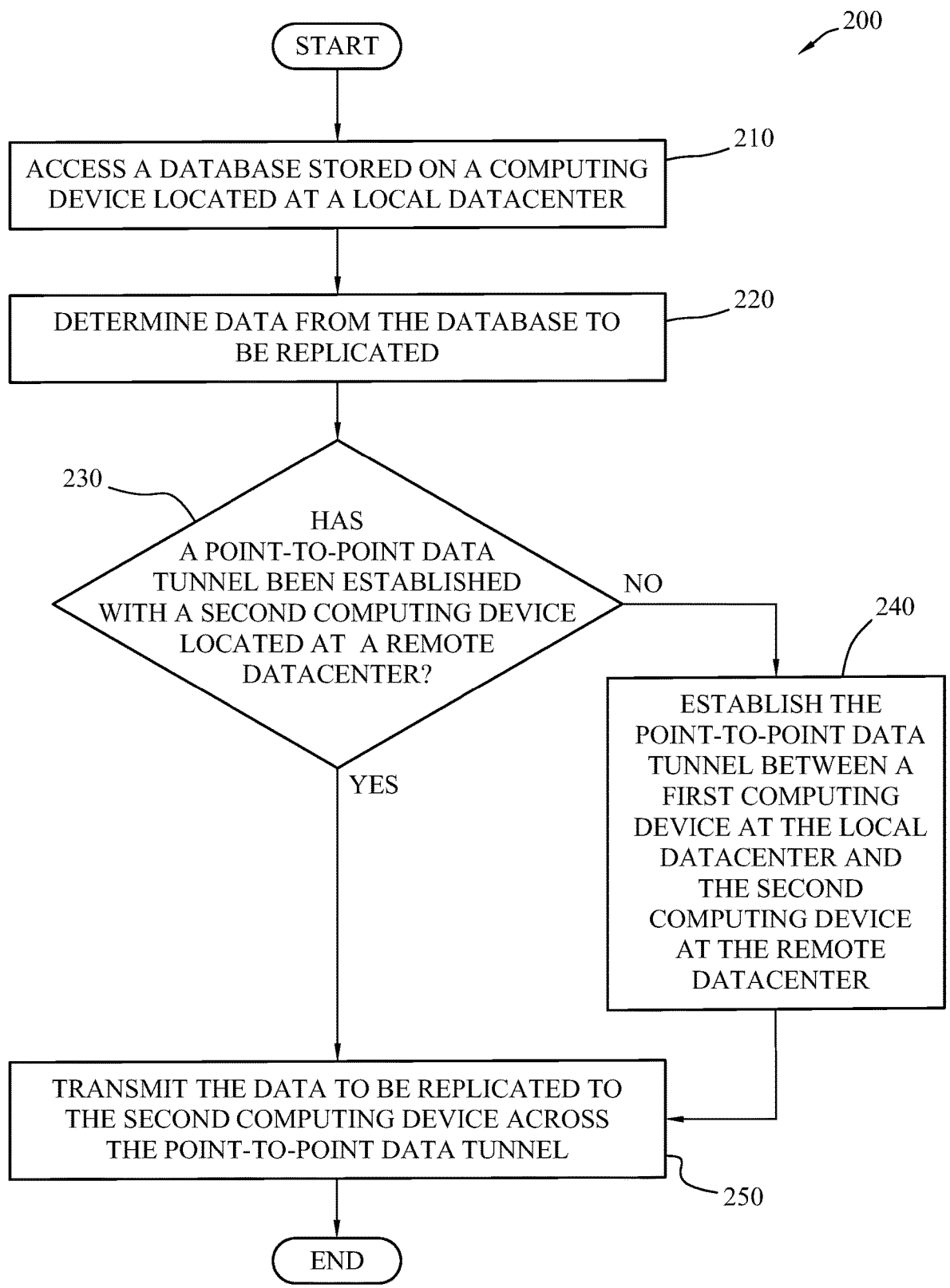
FIG. 2 illustrates an example method for data replication over a low-latency network.
Figure 3:
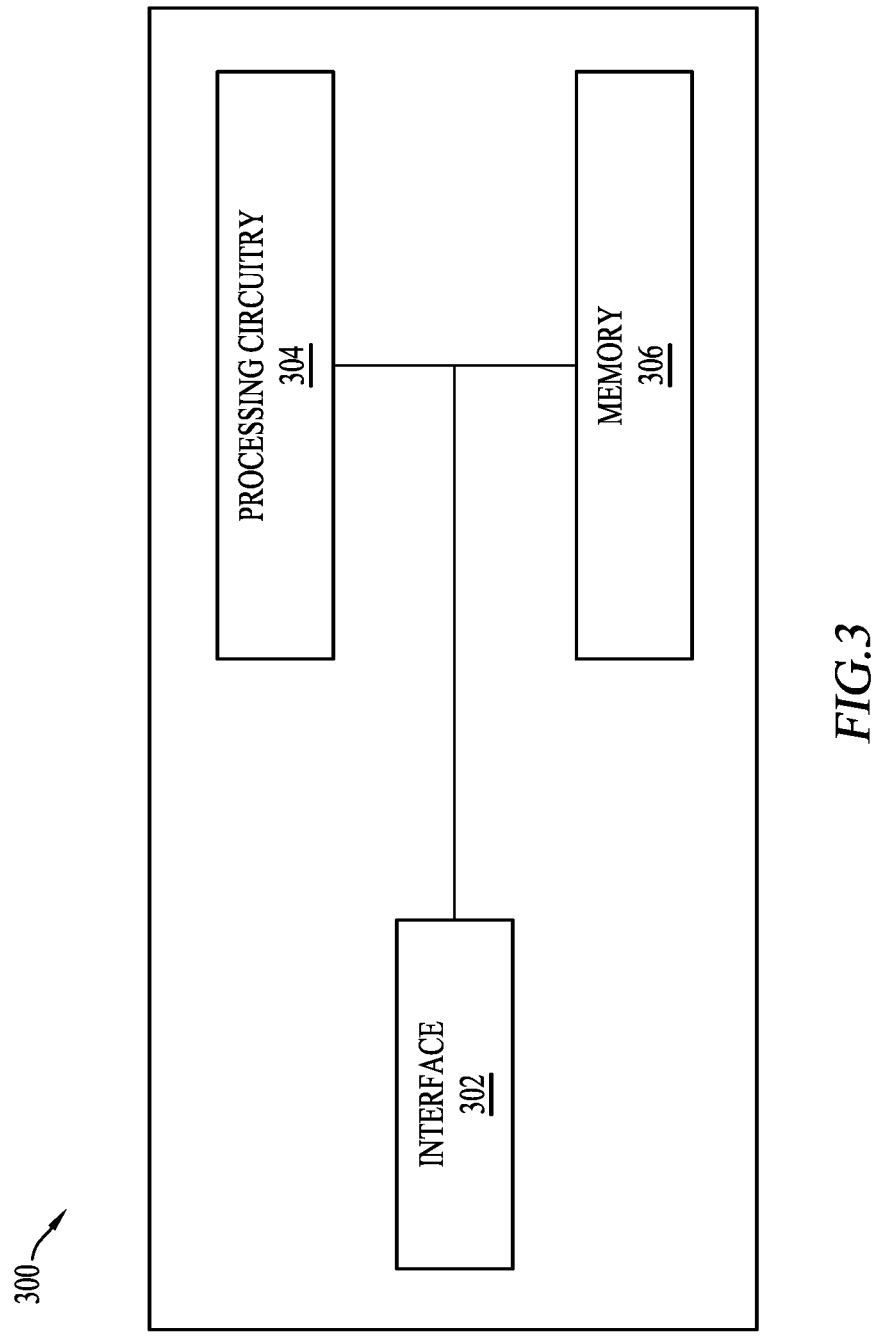
FIG. 3 illustrates an example computer system that may be used by the systems and methods described herein.

FIGS. 1 through 3 show example systems and methods for data replication using point-to-point data tunnels over a low-latency network. FIG. 1 illustrates an example system for data replication over a low-latency network. FIG. 2 illustrates an example method for data replication over a low-latency network. FIG. 3 illustrates an example computer system that may be used by the systems and methods described herein.

FIG. 1 illustrates an example data replication system 100, according to certain embodiments. Data replication system 100 includes multiple data centers 110 (e.g., 110A, 110B, 110C, etc.) and a network 130. In some embodiments, each data center 110 is located at a different geographical location than the other data centers 110. For example, data center 110A may be located in a first city and data center 110B may be located in another city. Each data center 110 includes one or more computing systems 115 (e.g., computing systems 115A, 115B, 115C, etc.) and is communicatively coupled to a network 130. Each data center 110 is capable of establishing a dedicated point-to-point data tunnel 120 with any other data center 110 and can transmit replication data 125 to any other data center 110 over point-to-point data tunnel 120.

Data center 110 is any location (e.g., a building, a dedicated space within a building, etc.) to house computing systems 115 and associated components, such as telecommunications, networking, and computer storage systems. In some embodiments, data centers 110 are located in different geographic locations in order to more adequately serve a geographically-dispersed customer base. For example, a first data center 110A may be located in a first region (e.g., the West coast of the United States), a second data center 110B may be located in a second region (e.g., the central portion of the United States), and a third data center 110C may be located in a third region (e.g., the East coast of the United States) in order to serve customers in the United States. By having multiple data centers 110 that are located in different geographical regions, the customers' experience may be improved (e.g., quicker response times for websites, mobile applications, and the like).

Computing system 115 is any appropriate computing or networking element or node housed within data center 110.

In general, computing system 115 is capable of communicating with network 130 and establishing a point-to-point data tunnel 120 over network 130 with a computing system 115 of another data center 110. In some embodiments, computing system 115 is a database server. In some embodiments, computing system 115 is communicatively coupled to one or more databases (e.g., either stored internally within computing system 115 or on another computing system 115 within the same data center 110). FIG. 3 illustrates an example computer system that may be used for computing system 115.

Point-to-point data tunnel 120 is any dedicated data channel that may be used to transfer replication data 125 between two different data centers 110. In some embodiments, point-to-point data tunnel 120 is a backhaul data channel on a broadband cellular network such as a 5G network. In general, the bandwidth of each point-to-point data tunnel 120 is dedicated for the transfer of replication data 125 between only two data centers 110. This dedicated bandwidth provides a technical advantage over typical data replication systems. Typically, a centralized data replication "leader" computing system is used to replicate data to multiple data centers. For example, the data replication leader may receive replication data 125 that must then be transmitted to two or more data centers 110. This sharing of bandwidth increases network latency, network congestion, and ultimately the loss of data, which negatively impacts customer experience. Data replication system 100, on the other hand, utilizes point-to-point data tunnels 120 to replicate data between only two data centers 110. By replicating data between two data centers 110 using point-to-point data tunnels 120 over broadband cellular network 130, data collisions that are typical of most data-replication systems are reduced or eliminated altogether, thereby reducing data loss and ultimately improving overall customer experience.

Replication data 125 represents any information that can be electronically stored in a database or other computer storage. Replication data 125 may be any type of data (e.g., raw data, batched data, etc.). Replication data 125 may include data received by an entity (e.g., an institution, a retailer, a telecommunication company, and the like). Replication data 125 may include any data suitable for processing and may include information associated with one or more customers. For example, replication data 125 may include customer identifications, preferences, and the like. Replication data 125 may be retrieved from one or more data sources such as network 130, mobile devices, and the like.

Network 130 of data replication system 100 may be any type of network that facilitates communication between components of data replication system 100. Network 130 may connect data centers 110 of data replication system 100. Although this disclosure shows network 130 as being a particular kind of network, this disclosure contemplates any suitable network. One or more portions of network 130 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a broadband cellular network (e.g., a 3G network, a 4G network, a 5G network, a 6G network, a future broadband cellular network, etc.), a combination of two or more of these, or other suitable types of networks. Network 130 may include one or more networks. One or more components of data replication system 100 may communicate over network 130. For example, data center 110A may transmit replication data 125A to data center 110B over point-to-point data tunnel 120A using network 130.

In some embodiments, data replication system 100 includes a monitoring network element 140 communicatively coupled to network 130. In general, monitoring network element 140 is a centralized data communications monitoring system that monitors active point-to-point data tunnels 120. If monitoring network element 140 detects any errors or problems with an active point-to-point data tunnel 120, monitoring network element 140 may report the detected errors or problems. For example, if monitoring network element 140 detects errors on point-to-point data tunnel 120A, it may generate and send an alert or notification to an appropriate contact.

Although FIG. 1 illustrates a particular number of data centers 110, computing systems 115, and networks 130, this disclosure contemplates any suitable number of computing systems 115, and networks 130. For example, data center 110 may include more any number of computing systems 115. As another example, other data replication systems may include more or fewer than three data centers 110.

In operation, data replication system 100 replicates data between data centers 110 using point-to-point data tunnels 120. As an example, computing system 115A of data center 110A may access a first database (not illustrated) communicatively coupled to computing system 115A and determine that data stored in the first database needs to be replicated to a second database (not illustrated) that is communicatively coupled to computing system 115B of data center 110B. To replicate the data from the first database to the second database, computing system 115A may first determine whether point-to-point data tunnel 120A has been established across broadband cellular network 130 between computing system 115A and computing system 115B. If computing system 115A determines that point-to-point data tunnel 120A has not been established, computing system 115A establishes point-to-point data tunnel 120A across broadband cellular network 130 between computing system 115A and computing system 115B. In some embodiments, establishing point-to-point data tunnel 120A involves communicating with a node of network 130 and establishing a 5G backhaul data connection. Once point-to-point data tunnel 120A is established between computing system 115A and computing system 115B, computing system 115A replicates the data from the first database to the second database by transmitting replication data 125 to computing system 115B across point-to-point data tunnel 120A. By replicating data between two data centers 110 over dedicated point-to-point data tunnels 120, data collisions that are typical of most data-replication systems are reduced or eliminated altogether, thereby reducing data loss and improving customer experience with websites, mobile applications, and other applications that utilize data stored in data centers 110.

FIG. 2 shows an example method 200 for data replication over a low-latency network. Method 200 begins at step 210. At step 210, method 200 accesses a first database communicatively coupled to a first computing device of a first data center. In some embodiments, the first computing device is computing system 115 (e.g., computing system 115A). In some embodiments, the first database is stored locally within the first computing device. In other embodiments, the first database is stored within another computing device within the first data center that is communicatively coupled to the first computing device.

At step 220, method 200 determines that data stored in the first database needs to be replicated to a second database communicatively coupled to a second computing device of a second data center. In some embodiments, step 220 includes receiving a signal from another computing device that certain data needs to be replicated. In some embodiments, step 220 includes comparing a time stamp of the first database to a time stamp of the second database. If the timestamp of the first database is newer than the timestamp of the second database, method 200 may determine that data stored in the first database needs to be replicated to the second database.

At step 230, method 200 determines whether a point-to-point data tunnel has been established across a broadband cellular network between the first computing device and the second computing device. In some embodiments, the point-to-point data tunnel is point-to-point data tunnel 120. In some embodiments, the broadband cellular network is a 5G network. In some embodiments, the point-to-point data tunnel is a backhaul data connection.

At step 240, method 200 establishes the point-to-point data tunnel across the broadband cellular network between the first computing device and the second computing device when it is determined in step 230 that the point-to-point data tunnel has not been established. At step 250, method 200 replicates the data to the second database by transmitting the data to the second computing device across the point-to-point data tunnel. In some embodiments, the data transmitted in step 250 is replication data 125. After step 250, method 200 ends.

Modifications, additions, or omissions may be made to method 200 depicted in FIG. 2. Method 200 may include more, fewer, or other steps. Steps may be performed in parallel or in any suitable order. While discussed as specific components completing the steps of method 200, any suitable component of data replication system 100 may perform any step of method 200.

FIG. 3 illustrates an example of computing components 300, in accordance with certain embodiments. The computing components 300 may be used to implement any of the structures illustrated in FIG. 1, or one or more portions thereof, such as network 130 and/or computing system 115. The computing components 300 may comprise any suitable hardware and/or software configured to perform the functionality described above. The computing components 300 may be implemented using shared hardware or separate hardware. In certain embodiments, computing components 300 may be distributed in a cloud network environment.

In certain embodiments, the components comprise one or more interface(s) 302, processing circuitry 304, and/or memory(ies) 306. In general, processing circuitry 304 controls the operation and administration of a structure by processing information received from memory 306 and/or interface 302. Memory 306 stores, either permanently or temporarily, data or other information processed by processing circuitry 304 or received from interface 302. Interface 302 receives input, sends output, processes the input and/or output and/or performs other suitable operations. An interface 302 may comprise hardware and/or software.

Examples of interfaces 302 include user interfaces, network interfaces, and internal interfaces. Examples of user interfaces include one or more graphical user interfaces (GUIs), buttons, microphones, speakers, cameras, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 304 to exchange information with or through a network. Internal interfaces receive and transmit information among internal components of a structure.

Processing circuitry 304 communicatively couples to interface(s) 302 and memory 306, and includes any hardware and/or software that operates to control and process information. Processing circuitry 304 may include a programmable logic device, a microcontroller, a microprocessor, any suitable processing device, or any suitable combination of the preceding. Processing circuitry 304 may execute logic stored in memory 306. The logic is configured to perform functionality described herein. In certain embodiments, the logic is configured to perform the method described with respect to FIG. 2.

Memory 306 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 306 may be local/integrated with the hardware used by processing circuitry 304 and/or remote/external to the hardware used by processing circuitry 304.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system comprising:
a first data center comprising a first computing device, the first computing device communicatively coupled to a first database; and
a second data center comprising a second computing device, the second computing device communicatively coupled to a second database, the second computing device configured to:
determine data stored in the second database to be replicated to the first database;
determine whether a point-to-point data tunnel has been established across a broadband cellular network between the second computing device and the first computing device;
establish the point-to-point data tunnel across the broadband cellular network between the second computing device and the first computing device when it is determined that the point-to-point data tunnel has not been established; and
replicate the data to the first database by transmitting the data to the first computing device across the point-to-point data tunnel;
wherein the point-to-point data tunnel has at least some bandwidth that is dedicated for a transfer of the replication data between the first data center and the second data center; and
wherein the determining the data to be replicated comprises:
comparing a first timestamp for a first data record in the first database with a second timestamp for a corresponding second data record in the second database; and
when the first timestamp is newer than the second timestamp, determining that the first data record is to be replicated to the second database.

2. The system of claim 1, wherein the first and second computing devices are database servers.

3. The system of claim 1, wherein the second data center is located at a different geographical location than the first data center.

4. The system of claim 1, wherein the broadband cellular network comprises a 5G network.

5. The system of claim 1, wherein the point-to-point data tunnel comprises a backhaul data connection.

6. The system of claim 1, further comprising a monitoring network element communicatively coupled to the first and second data centers, the monitoring network element configured to:
detect an error on the point-to-point data tunnel; and
transmit an alert regarding the detected error.

7. The system of claim 1, wherein the data replication is performed in a leaderless configuration.

8. A first computing device located at a first data center, the first computing device communicatively coupled to a first database, the first computing device configured to:

determine data stored in the first database to be replicated to a second database, the second database communicatively coupled to a second computing device at a remote data center;

determine whether a point-to-point data tunnel has been established across a broadband cellular network between the first computing device and the second computing device;

establish the point-to-point data tunnel across the broadband cellular network between the first computing device and the second computing device when it is determined that the point-to-point data tunnel has not been established; and replicate the data to the second database by transmitting the data to the second computing device across the point-to-point data tunnel:

wherein the point-to-point data tunnel has at least some bandwidth that is dedicated for a transfer of the replication data between the first data center and the second data center, and wherein the determining the data to be replicated comprises:

comparing a first timestamp for a first data record in the first database with a second timestamp for a corresponding second data record in the second database, and when the first timestamp is newer than the second timestamp, determining that the first data record is to be replicated to the second database.

9. The first computing device of claim 8, wherein the first and second computing devices are database servers.

10. The first computing device of claim 8, wherein the remote data center is located at a different geographical location than the first data center.

11. The first computing device of claim 8, wherein the broadband cellular network comprises a 5G network.

12. The first computing device of claim 8, wherein the point-to-point data tunnel comprises a backhaul data connection.

13. The first computing device of claim 8, further comprising a monitoring network element communicatively coupled to the first and remote data centers, the monitoring network element configured to:

detect an error on the point-to-point data tunnel; and transmit an alert regarding the detected error.

14. The first computing device of claim 8, wherein the data replication is performed in a leaderless configuration.

15. A method performed by one or more processors, the method comprising:

determining data stored in a first database to be replicated to a second database, the first database communicatively coupled to a first computing device of a first data center, the second database communicatively coupled to a second computing device of a second data center;

determining whether a point-to-point data tunnel has been established across a broadband cellular network between the first computing device and the second computing device;

establishing the point-to-point data tunnel across the broadband cellular network between the first computing device and the second computing device when it is determined that the point-to-point data tunnel has not been established; and replicating the data to the second database by transmitting the data to the second computing device across the point-to-point data tunnel;

wherein the point-to-point data tunnel has at least some bandwidth that is dedicated for a transfer of the replication data between the first data center and the second data center; and wherein the determining the data to be replicated comprises:

comparing a first timestamp for a first data record in the first database with a second timestamp for a corresponding second data record in the second database; and when the first timestamp is newer than the second timestamp, determining that the first data record is to be replicated to the second database.

16. The method of claim 15, wherein the first and second computing devices are database servers.

17. The method of claim 15, wherein the second data center is located at a different geographical location than the first data center.

18. The method of claim 15, wherein the broadband cellular network comprises a 5G network.

19. The method of claim 15, wherein the point-to-point data tunnel comprises a backhaul data connection.

20. The method of claim 15, wherein the data replication is performed in a leaderless configuration.

* * * * *